US008318835B2

(12) United States Patent
Fernandes et al.

(10) Patent No.: US 8,318,835 B2
(45) Date of Patent: Nov. 27, 2012

(54) MATERIAL TO BE INJECTION MOLDED, PROCESS THEREOF, AND USE THEREFORE

(75) Inventors: Jefter Fernandes, Sao Paulo (BR); Jose Augusto Marcondes, Sao Carlos (BR); Reynaldo Boemer, Jr., S.B. do Campo (BR); Mario Donizete, Sao Carlos (BR); Leandro Preter, S.B. do Campo (BR)

(73) Assignee: Ford Motor Company Brasil Ltda., Sao Bernardo do Campo-SP (BR)

( * ) Notice: Subject to any disclaimer, the term of this patent is extended or adjusted under 35 U.S.C. 154(b) by 1109 days.

(21) Appl. No.: 11/911,610

(22) PCT Filed: Apr. 13, 2006

(86) PCT No.: PCT/BR2006/000072
§ 371 (c)(1),
(2), (4) Date: May 21, 2008

(87) PCT Pub. No.: WO2006/108256
PCT Pub. Date: Oct. 19, 2006

(65) Prior Publication Data
US 2009/0118398 A1    May 7, 2009

(30) Foreign Application Priority Data
Apr. 13, 2005  (BR) .................................. 0501280-5

(51) Int. Cl.
*A61K 8/73*    (2006.01)
*C08L 5/00*    (2006.01)
*B29C 47/00*   (2006.01)
*B27K 5/00*    (2006.01)
*C08K 11/00*   (2006.01)
*D04H 3/16*    (2006.01)
*D21B 1/04*    (2006.01)

(52) U.S. Cl. ............... 524/27; 524/13; 524/15; 264/115
(58) Field of Classification Search .................... 524/27, 524/13, 15; 264/115
See application file for complete search history.

(56) References Cited

U.S. PATENT DOCUMENTS

| 4,820,749 A | * | 4/1989 | Beshay ..................... 523/203 |
| 5,497,594 A | * | 3/1996 | Giuseppe et al. ............... 52/843 |
| 6,780,359 B1 | | 8/2004 | Zehner |
| 2002/0143083 A1 | | 10/2002 | Korney |
| 2003/0021915 A1 | * | 1/2003 | Rohatgi et al. .................. 428/15 |
| 2003/0087973 A1 | * | 5/2003 | Muzzy .............................. 521/48 |
| 2004/0214925 A1 | * | 10/2004 | Sigworth ......................... 524/13 |
| 2005/0038155 A1 | * | 2/2005 | Berghmans et al. .......... 524/284 |

FOREIGN PATENT DOCUMENTS

| DE | 199 56 164 | 5/2000 |
| DE | 20205713 | 7/2002 |
| EP | 865891 | 9/1999 |
| WO | WO-2004/035295 | 4/2004 |

* cited by examiner

*Primary Examiner* — Mark Eashoo
*Assistant Examiner* — Angela C Scott
(74) *Attorney, Agent, or Firm* — B. Aaron Schulman, Esq.; Stites & Harbison, PLLC

(57) ABSTRACT

The present invention refers to an adequate composite material to be prepared by an injection process and to an injection process of a composite material. In accordance with the process of the present invention, the composite material is prepared by carrying out the steps of (i) making the length of the natural fibers uniform; (ii) treating the surface of the natural fibers and of the lignocellulosic residues, if present; (iii) premixing the components of the composite; (iv) extruding and granulating the composite material; and (v) injection molding the material of the composite for the conformation of the parts.

18 Claims, No Drawings

MATERIAL TO BE INJECTION MOLDED, PROCESS THEREOF, AND USE THEREFORE

FIELD OF INVENTION

The present invention generally refers to a composite material and to a process for the preparation of a composite material.

More specifically, the present invention refers to a composite material that comprises a thermoplastic virgin or recycled polymer, strengthened with natural fibers, and to a process for the preparation of such injection molding composite material.

For the present specification, the following definitions are used:
  natural fibers or cellulose fibers: natural fibers of vegetal origin, or lignocellulosic fibers that contain lignin, which is a natural polyphenolic polymer.
  lignocellulosic residues: residues of vegetal origin that contain cellulose as the main chemical component and lignin, e.g., rice hull or wood dust.

BACKGROUND OF THE INVENTION

Composite materials are those materials that associate at least two materials of specific mechanical characteristics, which results in a third material with the desired mechanical properties. Normally, composite materials result from the association of a polymer with a strengthening material, generally a fiber, whether synthetic, of mineral or vegetal origin. The state of the art reveals a plurality of composite materials built by different polymer classes associated with different types of fibers, such as glass fiber, rock fibers, mineral wools, natural fibers etc.

Particularly, the state of the art reveals composite materials made of polymer of the polyolefin class, such as the polypropylene or the polyethylene terephthalate, associated with natural fibers, such as sisal fiber, cocoa fiber etc.

Currently, the process for the preparation of composite materials through the association of a polymer and a natural fiber is carried out by molding, which considerably limits the form of the composite material and, consequently, its commercial application. As it is clear for those skilled in the art, the molding process allows the manufacturing of objects with limited structure and form, thus reducing the applications of the composite material.

Until today, an injection molding process has not been effectively carried out for composite materials made of polymers and natural fibers. This limitation to the molding process is associated to several difficulties of the injection process. Firstly, due to the hygroscopic and hydrophilic nature of the natural fibers, there is a tendency of humidity absorption, which generates the formation of gas during the injection process. This is because, due to the injection process, volatile gases are formed that are locked in the interior of the injection unit (gorge and screw), when the dosage step takes place (speed of the screw×contra-pressure), and inside the cavity of the mold during the injection molding cycle. Consequently, a product is formed with porosity and microstructure similar to an expanded structure. Moreover, the distribution of porosity is influenced by the processing conditions during injection (such as pressure, temperature, and time), and consequently compromises the mechanical properties of the material.

Therefore, it is an object of the present invention a process for the preparation of a composite material that overcomes the deficiencies of the processes found in the state of the art.

More particularly, it is an object of the present invention to present an adequate material to be molded in an injection process resulting in a composite.

Another object of the present invention is a process for the preparation of a composite material that is comprised of a thermoplastic polymer, particularly a polyolefin, associated to natural fibers.

Another object of the present invention is an injection process for a composite material comprising a thermoplastic polymer, particularly a polyolefin, associated to natural fibers.

Another object of the present invention is the composite material prepared by the injection process in accordance with the present invention that is particularly adequate for the manufacture of automotive spare parts.

DESCRIPTION OF THE INVENTION

The above-mentioned objects, among others, are attained with the present invention that constitutes an adequate material to be injection molded that comprises:
  approximately 30% to approximately 90% in weight of a recycled thermoplastic polymer;
  approximately 0.01% to approximately 70% in weight of a virgin thermoplastic polymer; and
  approximately 0.01% to approximately 60% in weight of a natural fiber.

Particularly, the thermoplastic polymer is the polypropylene homopolymer or the polyethylene terephthalate (PET)

The composite material according to the present invention may additionally comprise one or more of the following:
(a) when such thermoplastic polymer is the polypropylene homopolymer:
  approximately 0.01% to approximately 60% in weight of a second natural fiber;
  approximately 0.01% to approximately 30% in weight of a lignocellulosic residue;
  approximately 0.01% to approximately 20% in weight of a polypropylene copolymer with a medium ethylene content;
  approximately 0.01% to approximately 20% in weight of a polypropylene copolymer with high ethylene content;
  approximately 0.01% to approximately 2% in weight of a compatibilizer polypropylene functionalized with a maleic anhydride or an ionomer;
  approximately 0.01% to approximately 0.5% in weight of a auxiliary processing agent/dispersant;
  approximately 0.01% to approximately 0.3% of a primary antioxidant and a secondary antioxidant;
  approximately 0.01% to approximately 2% of one or more pigments; and
  approximately 0.01% to approximately 0.2% of a stabilizer in ultraviolet light.
(b) when such thermoplastic polymer is the PET:
  approximately 0.01% to approximately 60% in weight of a second natural fiber;
  approximately 0.01% to approximately 30% in weight of a lignocellulosic residue;
  approximately 0.01% to approximately 15% in weight of an elastomeric impact modifier;
  approximately 0.01% to approximately 0.5% in weight of a auxiliary processing agent/dispersant; and
  approximately 0.01% to approximately 2% in weight of one or more pigments.

The present invention also refers to a process for the manufacture of an injected composite material that comprises the steps of:
i—making the length of the natural fibers uniform;
ii—superficially treating the natural fibers and the lignocellulosic residues, when present;
iii—premixing the components of the composite;
iv—extruding and granulating the composite material; and
v—injection molding for the conformation of parts.

When the PET matrix is employed, the step (vi) of drying of the natural fibers and of the lignocellulosic residues, if present, is carried out advantageously before step (iii) and after step (ii).

DESCRIPTION OF PARTICULAR EMBODIMENTS

In accordance with the present invention, a composite material and a process for the preparation of a composite material comprising a thermoplastic polymer, for example a polyolefin and natural fibers, is presented.

Among the polyolefins, particularly useful are the polypropylene homopolymer, the polyethylene terephthalate (PET), the polystyrene etc. The polypropylene homopolymer or the PET is advantageously employed.

In accordance with an embodiment of the present invention, the composite material comprises approximately 30% to approximately 90% in weight of a recycled polypropylene homopolymer; approximately 0.01% to approximately 70% in weight of a virgin polypropylene homopolymer; and approximately 0.01% to approximately 60% in weight of a natural fiber.

Among the natural fibers, particularly useful are the fibers of sisal, sugar cane molasses, of cocoa, of piaçava, of soy, of jute, of ramie and of curauá.

The composite material of the present invention may also comprise approximately 0.01% to approximately 60% in weight of another natural fiber, advantageously chosen among the above-listed natural fibers.

Moreover, the composite material may also comprise approximately 0.01% to approximately 30% in weight of a lignocellulosic residue. Among the lignocellulosic residues, particularly useful are wood dust or rice hull.

Therefore, among other variations in the composite material of the present invention, one single natural fiber, or two types of natural fibers, or one single natural fiber combined with a lignocellulosic residue, or two types of natural fibers combined with a lignocellulosic residue may be employed, thus allowing the preparation of a variety of hybrid materials.

Other components may be added to the composite material, such as approximately 0.01% to approximately 20% in weight of a polypropylene copolymer with a medium ethylene content (containing about 4% to 8% ethylene); approximately 0.01% to approximately 20% in weight of a polypropylene copolymer with high ethylene content (containing about 8% to 12% ethylene); approximately 0.01% to approximately 2% in weight of a polypropylene compatibilizer functionalized with a maleic anhydride or an ionomer based on ethylene-acrylic acid or ethylene-methacrylic acid copolymers neutralized with sodium; approximately 0.01% to approximately 0.5% in weight of an auxiliary processing agent/dispersant; approximately 0.01% to approximately 0.3% of a primary antioxidant and a secondary antioxidant; approximately 0.01% to approximately 2% of one or more pigments; and approximately 0.01% to approximately 0.2% of a stabilizer in ultraviolet light.

In accordance with another embodiment of the present invention, the composite material comprises:
approximately 30% to approximately 90% in weight of a recycled polyethylene terephthalate;
approximately 0.01% to approximately 70% in weight of a virgin polyethylene terephthalate; and
approximately 0.01% to approximately 60% in weight of a natural fiber.

The composite material, according to this embodiment of the present invention, may additionally comprise:
approximately 0.01% to approximately 60% in weight of a second natural fiber; and
approximately 0.01% to approximately 30% in weight of a lignocellulosic residue.

Among the natural fibers, particularly useful are fibers of sisal, sugar cane molasses, of cocoa, of piaçava, of soy, of jute, of ramie and of curauá.

Among the lignocellulosic residues, particularly useful are wood dust or rice hull.

The composite material, according to this embodiment may additionally comprise approximately 0.01% to approximately 15% in weight of an elastomeric impact modifier; approximately 0.01% to approximately 0.5% in weight of an auxiliary processing agent/dispersant; and approximately 0.01% to approximately 2% in weight of one or more pigments.

The present invention also refers to a process for the preparation of a composite material.

The process starts after the choice of the formulation of the composite material in accordance with the ranges defined above.

After the definition of the formulations of the composite, it is necessary to proceed with (i) the uniformization of the fiber length. As it is well known for those skilled in the art, the natural fibers have different lengths and sometimes the length is above the desired, whereby an uniformization of its length is advantageous to better make use of them in the process of the present invention. The uniformization operation of the fiber length may be carried out by any adequate means, for example, in a hammer mill with an appropriate set of knifes, and controlled speed operation to avoid the formation of fines undesired in the production of composite granulate. A particularly adequate fiber length for the process of the present invention is between about 1 mm and about 8 mm, more particularly between about 2 mm and about 6 mm.

After the length uniformization, it is proceeded with (ii) the treatment of the fiber surfaces. When lignocellulosic residues are employed together with natural fibers, those must also be treated superficially. In accordance with the process of the present invention, the superficial treatment of the fibers and/or of the lignocellulosic residues is applied with a content of 1% of the treatment agent in relation to the total mass of the natural fiber and/or the lignocellulosic residue. Among the treatment agents, particularly employed are silanes (diamino silanes, methacrylate silanes, cationic stearylaminic silanes, epoxy silanes, vinyl silanes and chlorine alkyl silanes); titanates (monoalcoxy, chelates, coordinates, quaternary, and neoalcoxys); zirconate; different proportions of stearic acid and calcium stearate.

When the PET standard is used, (vi) the drying of the components of the composite is carried out, if the natural fiber does no have a humidity ratio adequate for the process of the present invention. The natural fibers may be dried by any adequate means, such as an oven with air circulation or high-efficiency driers, so that the humidity does not exceed approximately 1,000 ppm.

The components of the composite material, except for the fibers, are (iii) premixed and physically homogenized in low-rotation mixers at room temperature.

Then, the step of (iv) extrusion and granulation of composite material is carried out. In this step, the natural fibers and possible lignocellulosic residues are incorporated into the polymeric matrixes, followed by the granulation of the composite material.

For the extrusion, in accordance with the process of the present invention, a modular co-rotational double-screw extruder is particularly employed, with interpenetrating screws and equipped with gravimetric high-precision dosing and feeding equipment. By a modular extruder, it should be interpreted as an extruder the profile of the screws of which is not fixed, i.e. the profile can be changed depending on the process parameters, thus leading to a higher malleability and flexibility of the extrusion process. An adequate extruder for the process of the present invention is the one of Werner & Pfleiderer, Dinkelsbühl, Germany.

The profile of the modular screws, i.e. the type, number, distribution sequence, and the adequate positioning of the elements determine an extrusion particularly adequate for the process of the present invention. Preferably, profiles of modular screws with pre-established configurations of transport elements are employed: conventional 42/42 screw and conventional screw element 20/10 LH left hand; softening elements: sheering elements KB 45/5/42; sheet metal elements KB 45/5/14 LH left hand; and high shearing element KB 90/5/28, to control the fusion and the mix—dispersion and distribution—of the components of the composite material.

The natural fibers are directly inserted into the feeding funnel of the extruder and/or into an intermediate position, where the polymeric matrix is already melted.

After granulation, the composite material is ready for (v) injection. The injection is advantageously carried out in an injector through which the control of the injection variables is possible, such as temperature of the melted element, speed of the screw at dosage and contra-pressure.

For the injection of the composite material with a polypropylene matrix, preferably the following ranges should be employed in the process:
injection pressure between about 300 and about 650 bar;
injection speed between about 20 and about 40 cm$^3$/s;
switching between about 300 and about 600 bar;
packaging pressure between about 300 and about 550 bar;
packaging time between about 8 and about 12 s;
dosage speed between about 6 and about 10 m/min;
contra-pressure between about 5 and about 10 bar;
cooling time between about 15 and about 24 s; and
mold temperature between about 20 and about 40° C.

For the injection of the composite material with a polyethylene terephthalate matrix, the following ranges should be employed during the injection:
injection pressure between about 600 and about 850 bar;
injection speed between about 20 and about 40 cm$^3$/s;
switching between about 600 and about 800 bar;
packaging pressure between about 400 and about 750 bar;
packaging time between about 10 and about 15 s;
dosage speed between about 6 and about 10 m/min;
contra-pressure between about 5 and about 20 bar;
cooling time between about 18 and about 24 s; and
mold temperature between about 10 and about 30° C.

EXAMPLES

The present invention is now described in relation to practical examples of particular embodiments to better illustrate the present invention, without imposing any limiting character besides those contained in the attached claims.

Example 1

A composite material was prepared in accordance with the process of the present invention. The formulation of the composite material is in accordance with table 1 below:

TABLE 1

| Component | Percentage in weight (%) | |
|---|---|---|
| Polypropylene | 70% | 60% recycled polypropylene |
|  |  | 10% virgin polypropylene |
| Fiber of Sugar Cane Molasses |  | 30% |

The formulation of the composite material was submitted to the process of the present invention. The physical-mechanical properties of the composite material are illustrated in table 2 below:

TABLE 2

| Property/Test | Test Method | Value |
|---|---|---|
| Melt Flow Index - MFI | ISO 1133, 230° C./2,160 g | 2.5 g/10 min |
| Density | ISO 1183, A | 1.10 g/cm$^3$ |
| Tensile Strength at Yield Resistance towards tension in the drainage | ISO 527, 5 mm/min | 29 MPa |
| Tensile Modulus | ISO 527, 5 mm/mim | 3,050 MPa |
| Extension in rupture | ISO 527, 5 mm/min | 2.5% |
| Resistance to flexion | ISO 178, 2 mm/min | 38 MPa |
| Flexural Modulus | ISO 178, 2 mm/min | 2,450 MPa |
| Izod Impact Strength, notched | ISO 180/1 A | 3.8 kJ/m$^2$ |
| HDT—Heat Distortion Temperature | ISO 75, A/1.8 MPa | 63° C. |
|  | ISO 75, B/0.45 MPa | 105° C. |

Example 2

A composite material, in accordance with formulation in table 3 below, was prepared in accordance with the process of the present invention:

TABLE 3

| Component | Percentage in weight (%) | |
|---|---|---|
| Polypropylene | 70% | 60% recycled polypropylene |
|  |  | 10% virgin polypropylene |
| Sisal Fiber |  | 30% |

The physical-mechanical properties of the composite material are resumed in table 4 below:

TABLE 4

| Property/Test | Test Method | Value |
|---|---|---|
| Melt Flow Index - MFI | ISO 1133, 230° C./2,160 g | 2.1 g/10 min |
| Density | ISO 1183, A | 1.12 g/cm$^3$ |
| Tensile Strength at Yield | ISO 527, 5 mm/min | 31 MPa |
| Tensile Modulus | ISO 527, 5 mm/mim | 3,000 MPa |
| Extension in rupture | ISO 527, 5 mm/min | 2.0% |

TABLE 4-continued

| Property/Test | Test Method | Value |
|---|---|---|
| Resistance to flexion | ISO 178, 2 mm/min | 35 MPa |
| Flexural Modulus | ISO 178, 2 mm/min | 2,610 MPa |
| Izod Impact Strength, notched | ISO 180/1 A | 3.3 kJ/m$^2$ |
| HDT—Heat Distortion Temperature | ISO 75, A/1.8 MPa | 60° C. |
| | ISO 75, B/0.45 MPa | 100° C. |

Example 3

A composite material was prepared in accordance with the process of the present invention. The formulation of the composite material is in accordance with table 5 below:

TABLE 5

| Component | Percentage in weight (%) | |
|---|---|---|
| Polypropylene | 50% | 40% recycled polypropylene |
| | | 30% virgin polypropylene |
| Sugar Cane Molasses Fiber | 30% | |
| Wooden Dust - 60 mesh with 1% Struktol | 20% | |

The formulation of the composite material was submitted to the process of the present invention. The physical-mechanical properties of the composite material are resumed in table 6 below:

TABLE 6

| Property/Test | Test Method | Value |
|---|---|---|
| Melft Flow Index - MFI | ISO 1133, 230° C./ 2,160 g | 3.4 g/10 min |
| Density | ISO 1183, A | 1.08 g/cm$^3$ |
| Tensile Strength at Yield | ISO 527, 5 mm/min | 25 MPa |
| Tensile Modulus | ISO 527, 5 mm/mim | 3,180 MPa |
| Extension in rupture | ISO 527, 5 mm/min | 3.0% |
| Resistance to flexion | ISO 178, 2 mm/min | 37 MPa |
| Flexural Modulus | ISO 178, 2 mm/min | 2.500 MPa |
| Izod Impact Strength, notched | ISO 180/1 A | 3.0 kJ/m$^2$ |
| HDT—Heat Distortion Temperature | ISO 75, A/1.8 MPa | 68° C. |
| | ISO 75, B/0.45 MPa | 112° C. |

Example 4

A composite material was prepared in accordance with the process of the present invention. The formulation of the composite material is in accordance with table 7 below:

TABLE 7

| Component | Percentage in weight (%) | |
|---|---|---|
| Polypropylene | 67% | 50% recycled polypropylene |
| | | 17% polypropylene copolymer with high impact resistance |
| Sisal Fyber | 30% | |
| Orevac CA-100 Compatibilizer from Arquema | 2.7% | |
| Processing auxiliary of bis-stearamide | 0.3% | |

The formulation of the composite material was submitted to the process of the present invention. The physical-mechanical properties of the composite material are resumed in table 8 below:

TABLE 8

| Property/Test | Test Method | Value |
|---|---|---|
| Melt Flow Index—MFI | ISO 1133, 230° C./ 2.160 g | 2.5 g/10 min |
| Density | ISO 1183, A | 1.12 g/cm$^3$ |
| Tensile Modulus | ISO 527, 5 mm/mim | 3.250 MPa |
| Tensile Strength at Yield | ISO 527, 5 mm/min | 33 MPa |
| Extension in rupture | ISO 527, 5 mm/min | 2.0% |
| Flexural Modulus | ISO 178, 2 mm/min | 2.610 MPa |
| Resistance to flexion | ISO 178, 2 mm/min | 35 MPa |
| Izod Impact Strength | ISO 180/1 A | 4.0 kJ/m$^2$ |
| | ISO 75, A/1.8 MPa | 65° C. |
| | ISO 75, B/0.45 MPa | 108° C. |
| Inflammability | ISO 3795 | ≦100 mm/min |
| Fog Number | SAE J 1756 | 60 |
| Weathering resistance | SAE J 185, 1.240 kJ/m$^2$ | Rating 4-5 |

Thus, as can be seen, the present invention solves the inconveniences found in the state of the art in relation to a composite material adequate for being injection molded, as well as it presents a process for the preparation of an injection molding composite material. The composite material prepared has compatible physical-mechanical characteristics for commercial applications, particularly for applications in the automobile industry.

It must be understand that, although the present invention has been described in relation to its particular embodiments, those skilled in the art may develop a wide variation of details and expand the processes described herein to other types of applications, however, without disrespecting the principles of the invention. For example, the several elements shown in the different embodiments may be combined in a way not illustrated above. Thus, the attached claims must be interpreted as covering all equivalents that fit into the scope and the character of the invention.

The invention claimed is:

1. A process for manufacturing a composite material suitable to be used for the manufacture of automotive covering parts, the process comprising the steps of:
   (i) choosing and mixing a first natural fiber and a second natural fiber or lignocellulosic residue different from the said first natural fiber, wherein the total weight of natural fibers or lignocellulosic residue, when present, in relation to the total weight of the composite material is comprised between 10 and 60%;
   (ii) making the length of the natural fibers and lignocellulosic residue when present uniform;
   (iii) treating the surface of the natural fibers and of the lignocellulosic residues, when present, with a treatment agent;
   (iv) drying the natural fibers and the lignocellulosic residue, when present, wherein the humidity does not exceed about 1,000 ppm of water;
   (v) adding about 30 to 90% in weight of a recycled thermoplastic polymer and about 1 to 70% in weight of a virgin thermoplastic polymer, in relation to the total weight of the composite;
   (vi) premixing the natural fibers, the lignocellulosic residue when present and the polymer;
   (vii) extruding and granulating the composite material; and
   (viii) injection molding the composite material for the conformation of parts wherein in step (v) it is also added a polypropylene copolymer with medium ethylene content in about 0.01% to about 20% in weight in relation to the total weight of the composite.

2. The process of claim 1, wherein the length of the fibers is made uniform in step (ii) at about 1 mm to 8 mm.

3. The process of claim 1, wherein the length of the fibers is made uniform in step (ii) at about 2 and 6 mm.

4. The process of claim 1, wherein the treatment agent of step (iii) is selected from the group consisting of silanes; titanates; zirconate; stearic acid; calcium stearate, and mixtures thereof, applied in a content of 1% in weight in relation to the total weight of the natural fibers.

5. The process of claim 4, wherein the silanes are selected from the groups consisting of: diamino silanes, methacrylate silanes, cationic stearylaminic silanes, epoxy silanes, vinyl silanes, chlorine alkyl silanes, and mixtures thereof; and the titanates are selected from the group consisting of monoalcoxy, chelates, coordinates, quaternary, neoalcoxys, and mixtures thereof.

6. The process of claim 1, wherein the thermoplastic polymer is the polypropylene homopolymer or the polyethylene terephthalate (PET).

7. The process of claim 1, wherein the natural fiber is selected from the groups consisting of: fibers of sisal, sugar cane molasses, cocoa, piassava, soy, jute, ramie, and curauá.

8. The process of claim 1, wherein the lignocellulosic residue is selected from the groups consisting of: wooden dust and rice hull.

9. The process of claim 1, wherein in step (v) it is also added a polypropylene compatibilizer functionalized with a maleic anhydride or an ionomer in about 0.01% to about 2% in weight in relation to the total weight of the composite.

10. The process of claim 1, wherein in step (v) an auxiliary processing agent/dispersant is added in an amount of about 0.01% to about 0.5% in weight in weight in relation to the total weight of the composite.

11. The process of claim 1, wherein in step (v) a primary antioxidant and a secondary antioxidant is added in an amount of about 0.01% to about 0.3% in weight in relation to the total weight of the composite.

12. The process of claim 1, wherein in step (v) one or more pigments are added in an amount of about 0.01% to about 2% in weight in relation to the total weight of the composite.

13. The process of claim 1, wherein in step (v) a stabilizer in ultraviolet light is added in an amount of about 0.01% to about 0.2% in weight in relation to the total weight of the composite.

14. The process of claim 1, wherein in step (v) an elastomeric impact modifier is added in an amount of about 0.01% to about 15% in weight in relation to the total weight of the composite.

15. The process of claim 1, wherein the extrusion step is carried out in a modular co-rotation double-screw extruder which employs a conventional 42/42 screw and a conventional screw element 20/10 LH left hand; and relaxation elements sheering elements KB 45/5/42; sheering element KB 45/5/14 LH left hand; and high sheering element KB 90/5/28.

16. The process of claim 1, wherein the injection step employs the following ranges in its variables, when polypropylene is used:
  injection pressure between about 300 bar and about 650 bar;
  injection speed between about 20 $cm^3$/s and about 40 $cm^3$/s;
  switching between about 300 bar and about 600 bar;
  packaging pressure between about 300 bar and about 550 bar;
  packaging time between about 8 s and about 12 s;
  dosage speed between about 6 m/min and about 10 m/min;
  contra-pressure between about 5 bar and about 10 bar;
  cooling time between about 15 s and about 24 s; and
  mold temperature between about 20° C. and about 40° C.

17. The process of claim 1, wherein the injection step (vi) employs the following ranges in its variables, when polyethylene terephthalate is used:
  injection pressure between about 600 bar and about 850 bar;
  injection speed between about 20 $cm^3$/s and about 40 $cm^3$/s;
  switching between about 600 and about 800 bar;
  packaging pressure between about 400 bar and about 750 bar;
  packaging time between about 10 s and about 15 s;
  dosage speed between about 6 m/min and about 10 m/min;
  contra-pressure between about 5 bar and about 20 bar;
  cooling time between about 18 s and about 24 s; and
  mold temperature between about 10° C. and about 30° C.

18. A process for manufacturing a composite material suitable to be used for the manufacture of automotive covering parts, the process comprising the steps of:
  (i) choosing and mixing a first natural fiber and a second natural fiber or lignocellulosic residue different from the said first natural fiber, wherein the total weight of natural fibers or lignocellulosic residue, when present, in relation to the total weight of the composite material is comprised between 10 and 60%;
  (ii) making the length of the natural fibers and lignocellulosic residue when present uniform;
  (iii) treating the surface of the natural fibers and of the lignocellulosic residues, when present, with a treatment agent;
  (iv) drying the natural fibers and the lignocellulosic residue, when present, wherein the humidity does not exceed about 1,000 ppm of water;
  (v) adding about 30 to 90% in weight of a recycled thermoplastic polymer and about 1 to 70% in weight of a virgin thermoplastic polymer, in relation to the total weight of the composite;
  (vi) premixing the natural fibers, the lignocellulosic residue when present and the polymer;
  (vii) extruding and granulating the composite material; and
  (viii) injection molding the composite material for the conformation of parts, wherein in step (v) it is also added a polypropylene copolymer with high ethylene content in about 0.01% to about 20% in weight in relation to the total weight of the composite.

* * * * *